United States Patent [19]

Chiodo

[11] 4,276,990
[45] Jul. 7, 1981

[54] PRESSURE COOKER WITH SEAL SAFETY RELIEF

[76] Inventor: Morvan Chiodo, Rua Dr. Berto Conde No. 321, Sao Paulo, Brazil

[21] Appl. No.: 128,409

[22] Filed: Mar. 10, 1980

Related U.S. Application Data

[63] Continuation of Ser. No. 954,096, Oct. 24, 1978, abandoned.

[30] Foreign Application Priority Data

Nov. 1, 1977 [BR] Brazil ................................. 5701390

[51] Int. Cl.³ ............................................. B65D 51/16
[52] U.S. Cl. ................................... 220/209; 220/298; 220/303; 220/304
[58] Field of Search ............... 220/209, 298, 303, 304, 220/316, 366

[56] References Cited

U.S. PATENT DOCUMENTS

| | | | |
|---|---|---|---|
| 2,399,115 | 4/1946 | Hansen | 220/298 |
| 2,600,703 | 6/1972 | Strom | 220/298 |
| 2,600,714 | 6/1972 | Wenscott | 220/298 |
| 2,608,318 | 8/1972 | Keller | 220/298 |

Primary Examiner—William Price
Attorney, Agent, or Firm—Robert E. Burns; Emmanuel J. Lobato; Bruce L. Adams

[57] ABSTRACT

A container for containing therein contents that develop a vapor pressure. The container has a cover provided with a vent opening for relieving internal pressures in the container when a predetermined internal pressure is exceeded. Control of the excess pressure venting is provided by a deformable seal that provides a pressure-tight seal between the cover and the container. The seal normally closes the vent opening and is deformable outwardly through a lateral opening on a peripheral flange on the cover when internal pressure in the container exceeds a predetermined limit excess pressure. The vent opening is disposed on the top of the cover so that as the seal deforms outwardly it uncovers the vent opening to relieve excess pressure. The material from which the seal is made is flexible and deformable and has memory so that it restores itself to a position closing the vent opening when the excess pressure is relieved.

1 Claim, 5 Drawing Figures

PRESSURE COOKER WITH SEAL SAFETY RELIEF

This is a continuation, of application Ser. No. 954,096, filed Oct. 24, 1978, now abandoned.

BACKGROUND OF THE INVENTION

The present invention relates to containers subjected to varying internal pressure and more particularly pressure cookers and pressure cooking pans.

Pressure cookers or cooking pans are well known and are provided with a safety relief valve to relieve excess pressure therein. Pressure cookers, however, are still subject to explosion when the safety relief valve is frozen and will not relieve excess pressure. The safety or relief valves will not respond to relieve excess pressure in a cooker, for example, when food clogs the valve and renders it ineffective to relieve internal pressures.

Moreover, explosions can occur when the user puts too much water or ingredients into the pressure cooker. As a consequence, safe pressures can be exceeded and the cooker can explode.

SUMMARY OF THE INVENTION

It is an object of the present invention to provide a new and improved simple and positive pressure relief mechanism for relieving excess internal pressure in a pressure cooker for whatever reason its cause.

According to the invention a container, for example either a pressure cooker or cooking pan for containing contents therein which develop a vapor pressure or can themselves exceed a given pressure, is provided with a cover provided with a top vent opening for relieving internal pressure in the container when a predetermined pressure is exceeded. Control of the excess pressure venting is provided by a deformable seal that provides a fluid-tight seal between the cover and the container. The seal normally closes the vent opening on the cover and is deformable outwardly through a lateral opening in a peripheral flange of the cover when internal pressure in the container exceeds a predetermined limit excess pressure. As the seal deforms outwardly through the lateral opening, the vent opening is uncovered to relieve the excess pressure.

The material from which the seal is made, for example rubber, is flexible and is deformable. It has a memory so that it restores itself to a position closing the vent opening when the excess pressure is relieved. The seal is constructed with a dove-tail inner periphery defined by two lips. A lower lip seats on the container rim and the upper lip seals the vent opening.

BRIEF DESCRIPTION OF THE DRAWINGS

Other objects and advantages will appear from the following description and example of the invention and the novel features pointed out in the appended claims and drawings in which:

DESCRIPTION OF THE PREFERRED EMBODIMENT

The pressure relief mechanism in accordance with the invention will be hereinafter described with respect to a pressure cooker. However, it will be understood that the invention is equally applicable to any container within which internal pressure is built up and must be relieved. It is particularly applicable to containers in which contents develop a vapor pressure by heating or otherwise are contained and the pressure is accordingly relieved.

Figure 3:
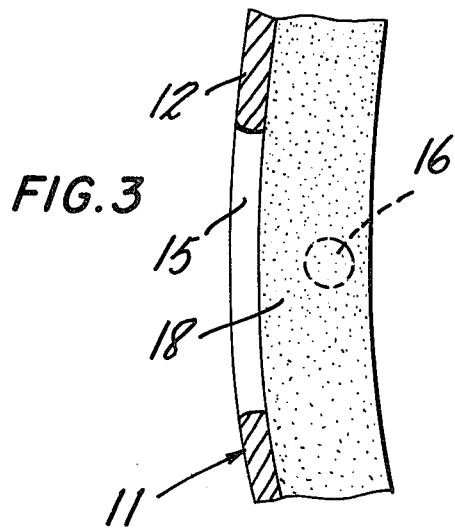
FIG. 3 is a fragmentary section view in plan of FIG. 2.

As illustrated in the drawing, a cooking pan or pressure cooker 10 is provided with a cover 11 having a peripheral flange 12 with a lip 13 that engages a flare or rim 14 of the pan 10. The cover is provided with at least one lateral opening 15 in the peripheral flange 12. At least one vent opening 16 is provided on the top of the cover. As can be seen in FIG. 3. The vent opening is on a top surface of the cover and is aligned with the lateral opening 15 with respect to the center of the cover 11 and is in the vicinity of the lateral opening.

Figure 1:
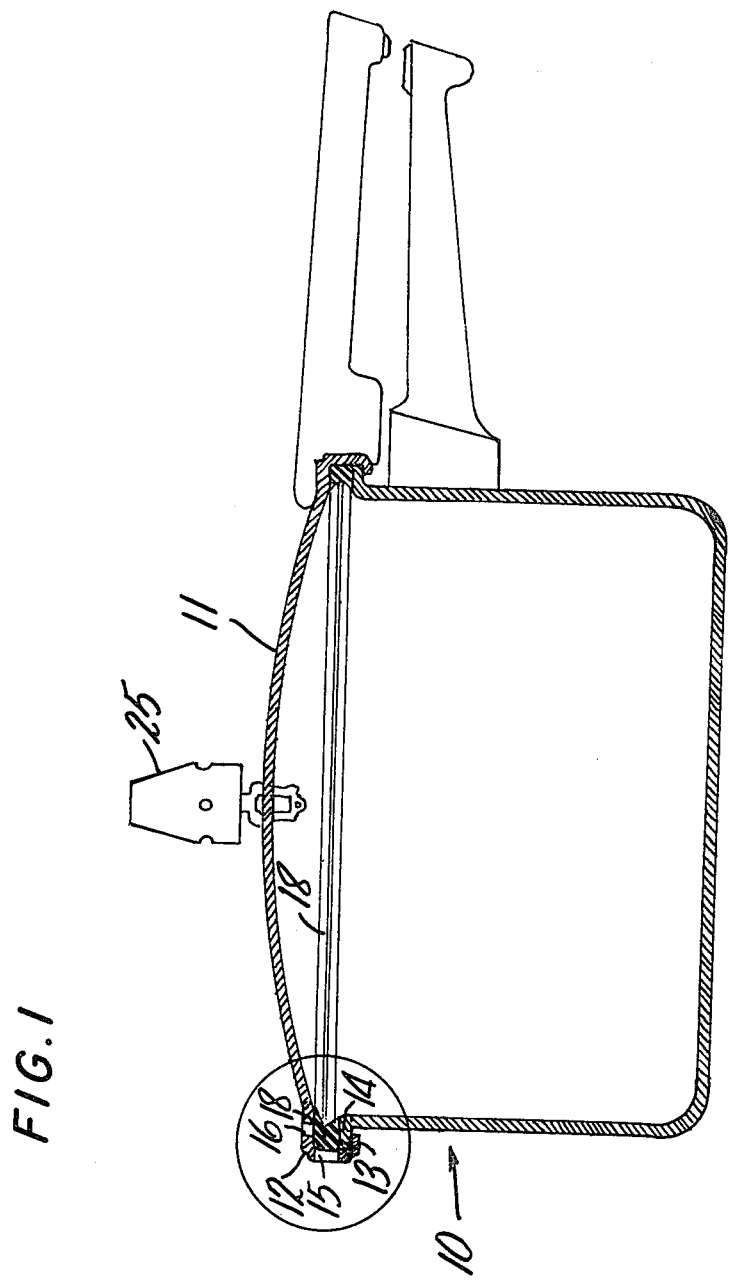
FIG. 1 is a sectional view of a pressure cooker or pan provided with a pressure relief mechanism according to the invention.
Figure 2:
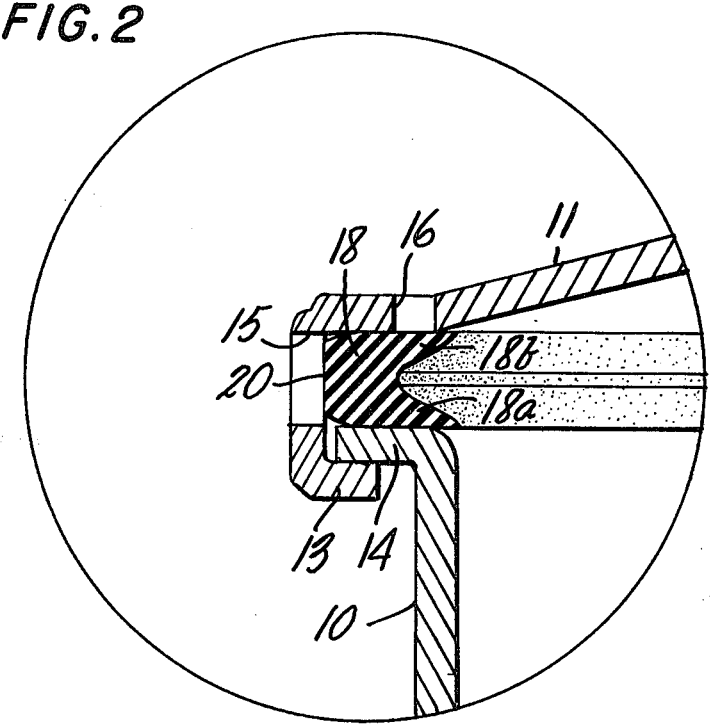
FIG. 2 is a detail view, on an enlarged scale, of a part of the container in FIG. 1.

A deformable seal 18 is provided in the flange of the cover and is made of a flexible or resilient material, such as rubber or a rubber-like material, which has a memory. The seal 18 has an inner periphery dove-tailed in cross section with a lower lip 18a and an upper lip 18b. The lower lip fits or seats on the rim 14 of the pan and the upper lip closes the vent opening 16 as illustrated in FIG. 2. The periphery of the seal is flat as illustrated at 20. The outer face or periphery is part of a bevelled portion of the peripheral or marginal portion of the seal as illustrated in FIG. 2. The seal seats within the housing defined by the flange 12 and is removable in conjunction with the cover when it is removed from the container.

Figure 4:
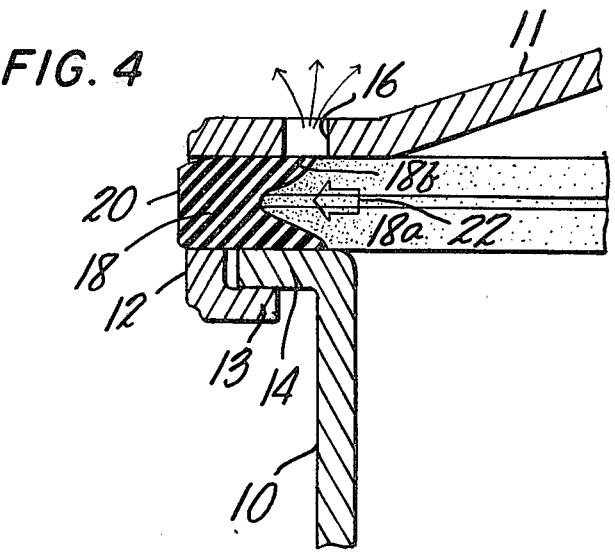
FIG. 4 is a fragmentary section view similar to FIG. 2 illustrating the mode of operation of the seal according to the invention.
Figure 5:
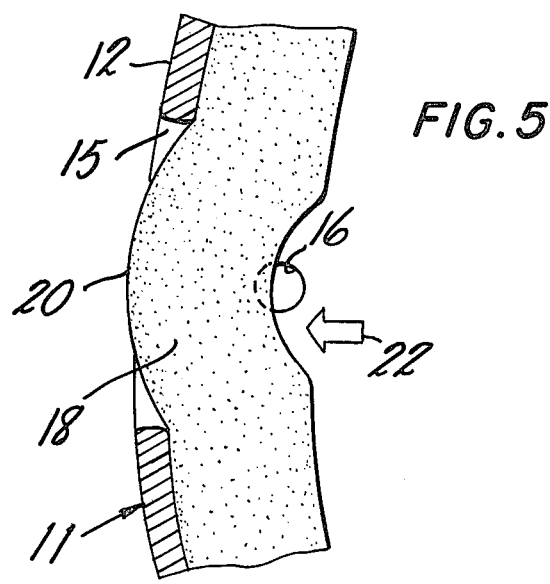
FIG. 5 is a fragmentary section view in plan of FIG. 4.

In the event that excessive pressure builds up within the container, for example due to excessive contents or vapor pressure, or a clogged relief valve, an outward pressure force illustrated by an arrow 22 in FIG. 4 is applied to the dove-tailed inner periphery of the seal so that it presses against the inner surface of the flange and is deformed outwardly along a peripheral section in registry with the lateral opening 15. The bevelled peripheral portion thereof will protrude, as illustrated in FIGS. 4 and 5, through the lateral opening in the flange of the cover so that the vent opening 16 is at least partially uncovered as illustrated in FIG. 5 and excess pressure is thereby relieved. The lateral opening 15 is sufficiently long in a peripheral direction so that the seal will deform thereinto and effectively control the venting of excess pressure through the vent opening. The seal material has a memory so that after the excess pressure is relieved, it will return to its normal position illustrated in FIG. 2 closing the vent opening.

The pressure cooker is provided with a conventional relief valve 25. The pressure relief valve 25 will relieve internal pressures when a predetermined pressure level is exceeded. In the event that the pressure relief valve is ineffective for whatever reason the predetermined pressure is exceeded and the seal is then effective to relieve the internal pressure to preclude an explosion.

Those skilled in the art will understand that the container can be made with a plurality of lateral openings and related vent openings functioning in the manner heretofore described.

What I claim:

1. In combination, a container for containing therein contents capable of developing a vapor pressure, means for relieving a vapor pressure in said container comprising a cover for said container having a peripheral flange, said cover having at least one lateral through opening on said flange, a vent opening comprising a through opening on a top cover surface of said cover in a locality adjacent said lateral opening in the flange, a flexible seal providing a seal between the cover and the container and underlying said vent opening and effectively sealing said lateral through opening and said vent opening simultaneously when the cover is disposed on said container, said seal comprising a flexible material flexing into said lateral through opening in the flange when vapor pressure in said container exceeds a predetermined pressure, the lateral through opening in the flange being sufficiently large in a circumferential direction to allow a circumferential section of said seal to flex outwardly thereinto and uncover the vent opening and vent the container vapor upwardly when the seal has flexed sufficiently into said lateral through opening when the vapor pressure exceeds said predetermined pressure, and the seal material having memory and restoring inwardly to a position sealing said vent opening when the vapor pressure in said container is less than said predetermined pressure.

* * * * *